2,097,152

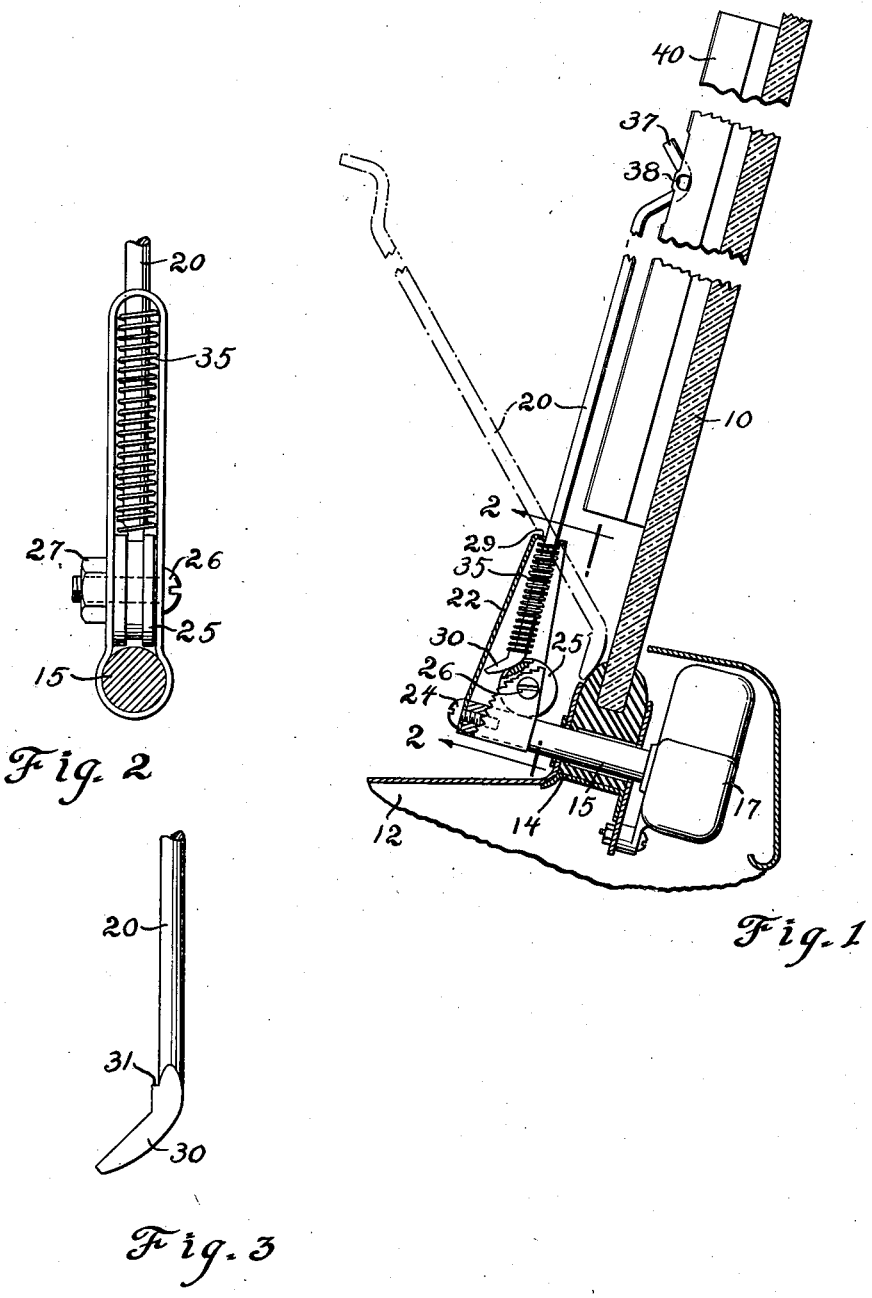
Oct. 26, 1937. E. GOETZ 2,097,152
WINDSHIELD WIPER
Filed Oct. 17, 1935
INVENTOR.
Emil Goetz Patented Oct. 26, 1937

UNITED STATES PATENT OFFICE 2,097,152

WINDSHIELD WIPER

Emil Goetz, Detroit, Mich.

Application October 17, 1935, Serial No. 45,429

3 Claims. (Cl. 15—255)

This invention relates to the construction of lever arms for the operation of mechanisms such as the windshield wipers of vehicles, aiming to provide such a device which is of neat appearance yet inexpensive to manufacture, and which incorporates mechanical advantages ordinarily unobtainable even in more elaborate and expensive constructions.

An important object is the provision of such an arm especially suited for use with wipers of the swinging type, incorporating means including a spring for pressing the wiper firmly and with uniform pressure against the glass, in which the spring and other tensioning means although associated and swingable with the arm are concealed from view by the bracket serving to attach the arm to the motor shaft, said bracket constituting a housing for such tensioning means.

An additional object comprises the provision of arm supporting means incorporating in addition to the advantages above mentioned means whereby the arm may be swung clear of the glass and the tensioning means automatically released, to facilitate cleaning the glass or replacement of the wiper blade or squeegee.

Other objects and advantages will be apparent from the following description, wherein reference is made to the accompanying drawing illustrating a preferred embodiment of my invention, and wherein similar reference numerals designate similar parts throughout the several views.

In the drawing:

Figure 1 is a view corresponding to a vertical section through the windshield and appurtenant portions of a closed motorcar body showing in side elevation a windshield wiper motor of the swinging type, together with my improved wiper arm construction, part of the latter being broken away;

Figure 2 is a detail section taken substantially on the line 2—2 of Figure 1, and looking in the direction of the arrows, and Figure 3 is a fragmentary elevational view of the attached end of the arm.

Referring now to the drawing:

Reference character 10 designates the windshield of a motorcar body 12, the windshield frame of which is generally designated 14. Through the frame 14 extends the shaft 15 of a windshield wiper motor 17. These parts, since they may be of conventional or any suitable construction, and mounted, as incidated, in more or less conventional manner, are illustrated somewhat diagrammatically and need not be described in detail. The shaft projects from the frame adjacent the windshield, also in the usual or any desired manner, to carry the improved wiper arm forming the subject matter of my invention.

The arm proper may comprise a wire element 20 carried by a housing and bracket element 22 formed of sheet metal and secured to the end of the motor shaft, as by the screw 24. The bracket element is elongated in the direction of the arm and open upon its side facing the windshield, but may be closed upon the outside for the sake of appearance, as indicated. Within the bracket, near the shaft and the edge of the bracket nearest the windshield is a roller 25 journaled upon a bolt 26 which also serves to clamp the bracket tightly upon the shaft, a nut 27 being threaded thereon upon the other side of the bracket.

The outer end of the bracket is perforated as at 29 to receive the arm, which extends therethrough and is provided with an inclined end portion 30 engaging the roller upon its side away from the windshield, and if desired flattened and somewhat rounded, as best indicated in Figure 3, for better rolling engagement with the groove with which the roller is shown provided. The inclined end of the arm is also shaped to provide a spring abutment, as at 31, and a compression spring 35 is carried by the arm within the bracket and trapped between the end wall of the latter and such abutment, its effect being to urge the arm into the bracket, thereby tending to roll the end 30 upon the roller in a direction the result of which is to force the inclined end of the arm outward away from the roller and windshield, thereby urging the free extremity of the arm, by which the wiper blade is carried, toward the glass, the fulcrum being supplied by the perforated end wall of the bracket through which the arm extends. The free end of the arm is hooked as at 37 for engagement with a retaining lug as 38 carried by the wiper blade 40. The manner of engagement of these parts is also not important to the invention except that since the free end of the arm is ordinarily that over which the spring 35 is threaded, and which is passed through the bracket in assembly, the simple hooked end which does not interfere with such assembling operations is to be preferred.

Aperture 29 in the end of the bracket is formed sufficiently large to allow considerable inclination of the arm from the straight line position. This, as indicated in dot-dash lines in Figure 1, permits swinging the arm away from the glass to enable cleaning the glass, and further enables replacement of the wiper blade without disassembling the arm and bracket. Turning of the arm and blade is prevented by engagement of the flattened end 30 within the groove in the roller, and the width of the bracket may be insufficient to allow turning in any event.

While it will be apparent that the illustrated embodiment of my invention herein disclosed is well calculated to adequately fulfill the objects and advantages herein set forth, it is to be understood that the invention is susceptible to variation, modification and change within the spirit and scope of the subjoined claims.

What I claim is:

1. An arm construction for windshield wipers and the like having an actuating shaft, said arm construction comprising a sheet metal bracket of elongated hollow construction adapted to be secured to the shaft, a roller within the bracket, an arm extending into and longitudinally slidable with respect to the bracket, an inclined end portion carried by the arm and engaging the roller, spring means also arranged within the bracket and exerting longitudinal force upon the arm tending to drive the inclined end of the arm against the roller, whereby the roller tends to move said end portion of the arm laterally, fulcrum means for the arm carried by the bracket at a position spaced from the roller and opposing said movement whereby said movement causes a lateral swinging movement of the arm and means carried by the free end of the arm for supporting a wiping element.

2. An arm for windshield wipers and the like having an actuating shaft, said arm construction comprising a sheet metal bracket of elongated hollow construction adapted to be secured to the shaft, an arm extending into and longitudinally slidable with respect to the bracket but swingable therewith, an inclined portion carried by the arm within the bracket, abutment means fixed with respect to the bracket and engageable by said inclined end portion, spring means also arranged within the bracket and exerting longitudinal effort upon the arm tending to move the same longitudinally and urge said inclined portion against the abutment means, whereby the engagement of said abutment means and inclined portion of the arm tends to move said end portion of the arm laterally, fulcrum means for the arm carried by the bracket at a position spaced from the abutment and opposing said movement whereby said movement causes a lateral swinging movement of the arm and means for supporting a wiping element upon the arm outside the bracket.

3. An arm for windshield wipers and the like having an actuating shaft, said arm construction comprising a bracket adapted to be secured to the shaft, an arm supported for swinging movement with but longitudinally slidable relatively to the bracket, said arm having an inclined portion overlying a part of the bracket, abutment means fixed with respect to the bracket and engageable by said inclined end portion, spring means arranged to urge the arm longitudinally and the inclined portion against the abutment means, whereby such engagement tends to move said end portion of the arm laterally, fulcrum means for the arm carried by the bracket at a position spaced from the abutment and opposing said movement whereby said movement causes a lateral swinging movement of the arm and means for supporting a wiping element upon the arm at a point spaced from the bracket.

EMIL GOETZ.